(12) United States Patent
Hashimoto et al.

(10) Patent No.: US 10,937,176 B2
(45) Date of Patent: Mar. 2, 2021

(54) OBJECT RECOGNITION APPARATUS

(71) Applicant: TOYOTA JIDOSHA KABUSHIKI KAISHA, Toyota (JP)

(72) Inventors: Daisuke Hashimoto, Chofu (JP);
Satoshi Takeyasu, Musashino (JP);
Kota Hirano, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 86 days.

(21) Appl. No.: 16/419,494

(22) Filed: May 22, 2019

(65) Prior Publication Data

US 2019/0370978 A1 Dec. 5, 2019

(30) Foreign Application Priority Data

May 31, 2018 (JP) .............................. JP2018-104686

(51) Int. Cl.
*G06T 7/246* (2017.01)
*G06T 7/73* (2017.01)

(52) U.S. Cl.
CPC ................ *G06T 7/246* (2017.01); *G06T 7/73* (2017.01); *G06T 2207/20084* (2013.01); *G06T 2207/30252* (2013.01)

(58) Field of Classification Search
CPC .. G06T 7/73; G06T 7/246; G06T 7/20; G06T 2207/20084; G06T 2207/30252; G06K 9/00805; G06K 9/00993; G06K 2009/3291
See application file for complete search history.

(56) References Cited

U.S. PATENT DOCUMENTS

2019/0064815 A1* 2/2019 Haynes ................. G05D 1/0221
2019/0065910 A1* 2/2019 Wang ........................ G06T 7/73

FOREIGN PATENT DOCUMENTS

| JP | H06-75935 A | 3/1994 |
| JP | 2014-067276 A | 4/2014 |

* cited by examiner

*Primary Examiner* — Brenda C Bernardi
(74) *Attorney, Agent, or Firm* — Oliff PLC

(57) ABSTRACT

An object recognition apparatus is provided with: a first output device configured to output a provisional position of a first object and a tracking priority by using a neural network; and a second output device configured to receive entries of the first image data, the provisional position and the tracking priority, and configured (i) to perform a time-series tracking process and output a position and a speed, for the first object in which the tracking priority satisfies a predetermined condition, and (ii) to output a position without performing the time-series tracking process, for the first object in which the tracking priority does not satisfy the predetermined condition. The neural network is a learned neural network that has learned by using teacher data, wherein the teacher data includes second image data, and correct answer data.

4 Claims, 4 Drawing Sheets

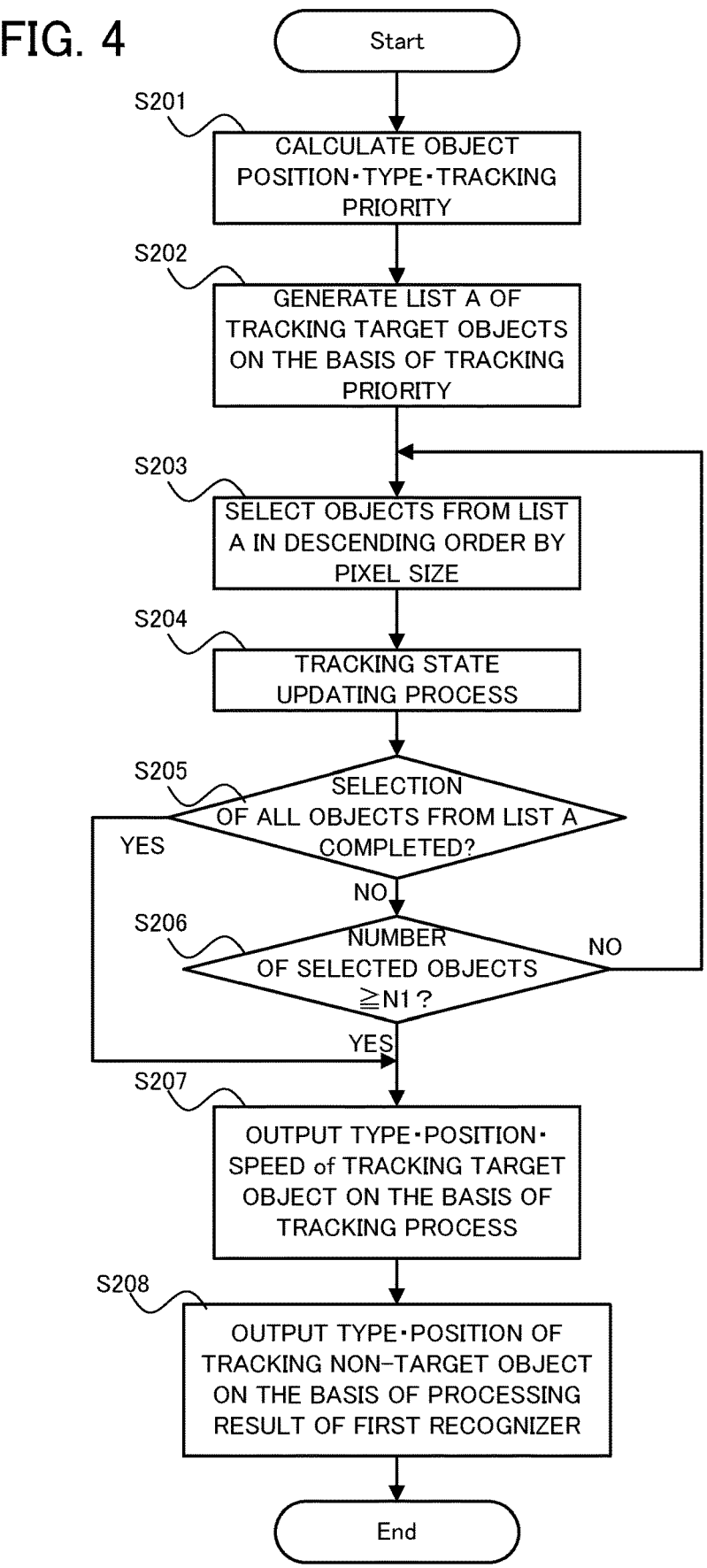

OBJECT RECOGNITION APPARATUS

CROSS-REFERENCE TO RELATED APPLICATIONS

This application is based upon and claims the benefit of priority of the prior Japanese Patent Application No. 2018-104686, filed on May 31, 2018, the entire contents of which are incorporated herein by reference.

BACKGROUND

1. Technical Field

Embodiments of the present disclosure relate to an object recognition apparatus configured to recognize an object included in image data.

2. Description of the Related Art

For this type of apparatus, there is known an apparatus configured to perform a tracking process, which is to track an object to be recognized, when performing image recognition (e.g., refer to Japanese Patent Application Laid Open No. 1106-075935 (Patent Literature 1)).

The object to be recognized includes: an object on which the tracking process is to be performed, i.e., an object from which useful information can be obtained by performing the tracking process thereon; and an object on which the tracking process is not to be performed, i.e., an object from which useful information cannot be obtained even if the tracking process is performed thereon. Thus, the execution of the tracking process on all the objects may cause a needless increase in an arithmetic or computational load, which is technically problematic. In the Patent Literature 1, the aforementioned problem is not considered, and there is room for improvement in suppressing the arithmetic load.

SUMMARY

In view of the aforementioned problem, it is therefore an object of embodiments of the present disclosure to provide an object recognition apparatus configured to perform object recognition while suppressing the arithmetic load.

The above object of embodiments of the present disclosure can be achieved by an object recognition apparatus configured to recognize a first object included in first image data on the basis of the first image data inputted in a time-series manner, the object recognition apparatus provided with: a first output device configured to output a provisional position of the first object and a tracking priority, which indicates a degree to which a time-series tracking process is to be performed, by using a neural network that receives an entry of the first image data; and a second output device configured to receive entries of the first image data, the provisional position and the tracking priority, and configured (i) to perform the time-series tracking process and output a position and a speed, for the first object in which the tracking priority satisfies a predetermined condition, and (ii) to output a position without performing the time-series tracking process, for the first object in which the tracking priority does not satisfy the predetermined condition, wherein the neural network is a learned neural network that has learned by using teacher data, wherein the teacher data includes second image data, which is different from the first image data, and correct answer data of the tracking priority and a position of a second object included in the second image data.

DETAILED DESCRIPTION OF THE EMBODIMENTS

FIG. 4 is a flowchart illustrating a flow of operations of an object recognizer according to the embodiment.

DETAILED DESCRIPTION OF THE EMBODIMENT

Hereinafter, an object recognition apparatus according to an embodiment of the present disclosure will be explained with reference to the drawings.

<Configuration of Apparatus>

Figure 1:
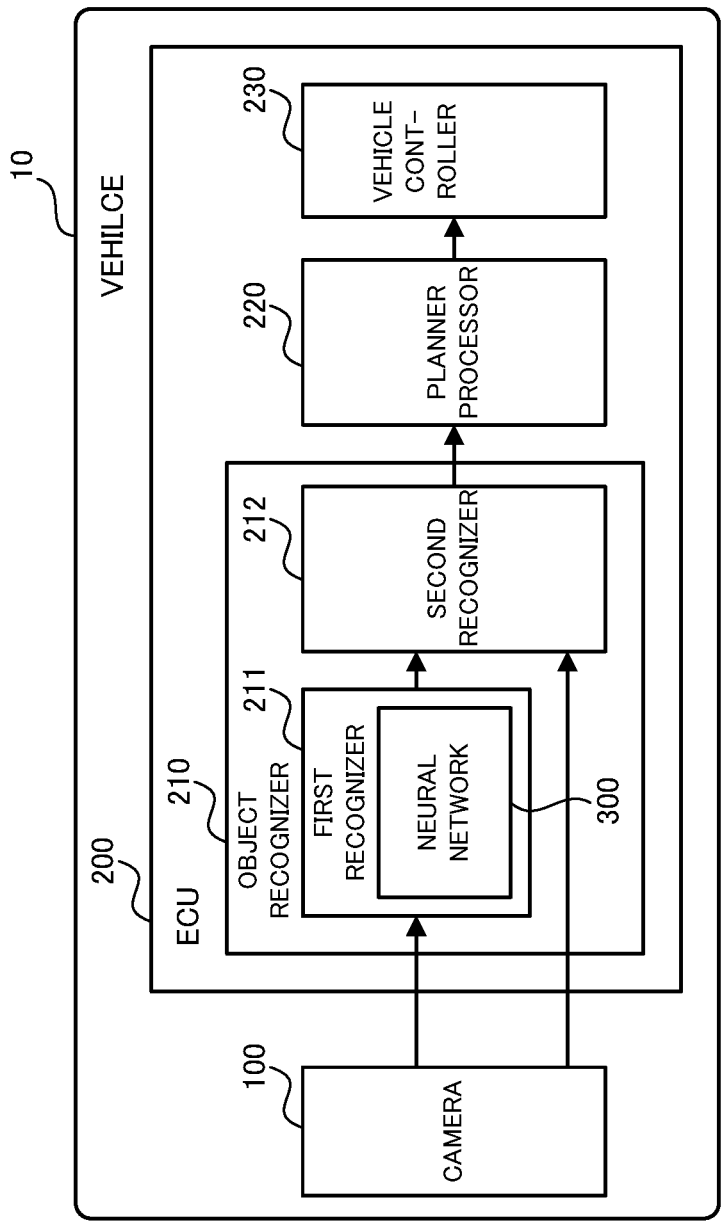
FIG. 1 is a block diagram illustrating a configuration of a vehicle according to an embodiment.

An entire configuration of a vehicle on which the object recognition apparatus according to the embodiment is mounted will be firstly explained with reference to FIG. 1. FIG. 1 is a block diagram illustrating the configuration of the vehicle according to the embodiment.

As illustrated in FIG. 1, a vehicle 10 according to the embodiment is provided with a camera 100 and an electronic control unit (ECU) 200.

The camera 100 is configured, for example, as an in-vehicle that can image or capture a scene around the vehicle 10 (e.g., a scene ahead in a moving direction). Time-series image data imaged by the camera 100 may be outputted to the ECU 200. The image data outputted by the camera 100 is a specific example of the "first image data" in Supplementary Notes described later.

The ECU 200 is configured as a control unit that can control each part of the vehicle. The ECU 200 is provided with an object recognizer 210, a planner processor 220, and a vehicle controller 230, as processing blocks or physical processing circuits for realizing the aforementioned function.

The object recognizer 210 is a part that functions as a specific example of the "object recognition apparatus" according to the embodiment, and is configured to recognize a position, a type, a speed, or the like of an object included in an image, from the image data imaged by the camera 100. The object recognizer 210 is provided with a first recognizer 211 and a second recognizer 212.

The first recognizer 211 is provided with a neural network 300 configured to receive an entry of the image data outputted from the camera 100. An arithmetic result of the neural network 300 may be outputted to the second recognizer 212. The first recognizer 211 is a specific example of the "first output device" in Supplementary Notes described later.

Figure 2:
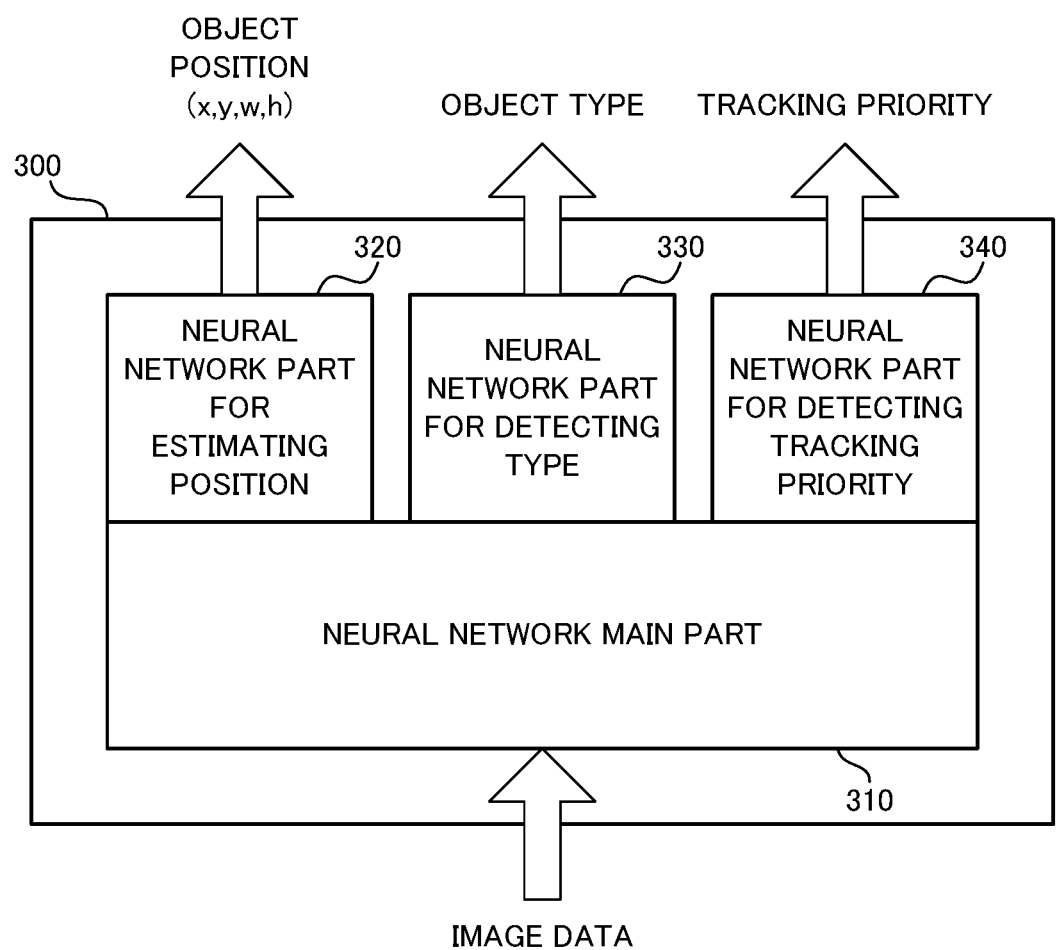
FIG. 2 is a block diagram illustrating a configuration of a neural network according to the embodiment.

Now, a specific configuration of the neural network 300 will be explained with reference to FIG. 2. FIG. 2 is a block diagram illustrating the configuration of the neural network according to the embodiment.

As illustrated in FIG. 2, the neural network 300 is provided with a neural network main part 310, a neural network part 320 for estimating a position, a neural network part 330 for detecting a type, and a neural network part 340 for detecting a tracking priority. Each of the aforementioned parts may include a plurality of convolution neural networks or the like. The image outputted from the camera 100 may be inputted to the neural network main part 310. Then, a position (in other words, coordinate information), a type (e.g., attribute information of a vehicle, a pedestrian, etc.), and a tracking priority of the object included in the image data may be outputted respectively from the neural network part 320 for estimating a position, the neural network part 330 for detecting a type, and the neural network part 340 for detecting a tracking priority.

The "tracking priority" herein may be a parameter for determining whether or not to perform a tracking process in the object recognizer 210. A high value may be calculated for an object on which the tracking process is to be preferentially performed, and a low value may be calculated for an object on which the tracking process is not to be preferentially performed. To put it differently, it may be a parameter indicating whether or not to perform high-accuracy recognition on the object. The tracking priority may be calculated, for example, on the basis of an occlusion rate of the object (i.e., a rate of the object that is covered or hidden by another object) or a truncation rate of the object (i.e., a rate of a part of the object that protrudes from an imaging range), or by determining whether or not the object is located on the other side of a guardrail or a median strip, or on the basis of a degree of an influence of the object on the driving of the vehicle 10, or the like.

More specifically, if the object has a high occlusion rate, i.e., a high rate of the object that is covered or hidden, it may be determined that the object is highly likely located on the back side as viewed from the vehicle 10, and a tracking priority with a relatively low value may be calculated. On the other hand, if the object has a low occlusion rate, i.e., a low rate of the object that is covered or hidden, it may be determined that the object is highly likely located on the near side as viewed from the vehicle 10, and a tracking priority with a relatively high value may be calculated. The occlusion rate can use, for example, a rate of a pixel area of the object on a camera image that is covered by another object, or the like. The occlusion rate of teacher data may be obtained by estimating a true pixel area of the object on the basis of an experimental rule by annotation operators, or model information about the object, when generating the teacher data, which will be described later, and by setting "Occlusion rate=(Estimated value of true pixel area of object−Pixel area of object on camera image)/Estimated value of true pixel area of object". By enabling the neural network 300 to learn the occlusion rate of the teacher data, the first recognizer 211 can estimate the occlusion rate of the object without a rule-based determination or without human intervention.

If the object has a high truncation rate, i.e., a high rate of a part of the object that protrudes from an image frame, it may be determined that the object is highly likely located in a position away from the front of the vehicle 10, and a tracking priority with a relatively low value may be calculated. On the other hand, if the object has a low truncation rate, i.e., a low rate of a part of the object that protrudes from the image frame, it may be determined that the object is highly likely located in a position close to the front of the vehicle 10, and a tracking priority with a relatively high value may be calculated. The truncation rate can use, for example, a rate of the pixel area of the object on the camera image, or the like. The truncation rate of the teacher data may be obtained by estimating a true pixel area of the object including an area outside a field of view (FOV) of the camera, on the basis of the experimental rule by annotation operators, or the model information about the object, when generating the teacher data, which will be described later, and by setting "Truncation rate=(Estimated value of true pixel area of object−Pixel area of object in FOV)/Estimated value of true pixel area of object". By enabling the neural network 300 to learn the truncation rate of the teacher data, the first recognizer 211 can estimate the truncation rate of the object without a rule-based determination or without human intervention.

Moreover, if the object is located on the other side of a guardrail or a median strip, it may be determined that the object highly likely does not influence the driving of the vehicle 10, and a tracking priority with a relatively low value may be calculated. On the other hand, if the object is located on the near side of the guardrail or the median strip, it may be determined that the object highly likely influences the driving of the vehicle 10, and a tracking priority with a relatively high value may be calculated. When generating the teacher data, which will be described later, a result of the determination of whether or not the object is located on the other side of the guardrail or the median strip, based on visual confirmation by annotation operators or the like, may be tagged. By enabling the neural network 300 to learn the tagged result, the first recognizer 211 can determine whether or not the object is located on the other side of the guardrail or the median strip, without a rule-based determination or without human intervention.

Moreover, if the object has a high degree of the influence on the driving of the vehicle 10, e.g., if the object is an object that can be determined to have a high collision probability, it may be determined that a recognition accuracy for the object should be increased, and a tracking priority with a relatively high value may be calculated. On the other hand, if the object has a low degree of the influence on the driving of the vehicle 10, e.g., if the object is an object that can be determined to have a low collision probability, it may be determined that the recognition accuracy for the object does not have to be increased, and a tracking priority with a relatively low value may be calculated. When generating the teacher data, which will be described later, a result of the determination of whether or not the object is an object that is followed in a normal driving habit, or whether or not the object is an object that needs to be followed, which is determined by annotation operators or the like on the basis of their driving experiences, may be tagged. By enabling the neural network 300 to learn the tagged result, the first recognizer 211 can determine whether or not to track the object, without a rule-based determination or without human intervention.

Back in FIG. 1, the second recognizer 212 is configured to calculate a position of the object, a type of the object, an instance unique ID of the object, and a speed of the object, on the basis of the image data outputted from the camera 100 and various information inputted from the first recognizer 211 (in other words, the neural network 300). A calculation result of the second recognizer 212 may be outputted to the planner processor 220. The second recognizer 212 is a specific example of the "second output device" in Supplementary Notes described later.

The planner processor 220 is configured to determine how to control the driving of the vehicle 10 on the basis of the recognition result of the object recognizer 210, i.e., the position of the object, the type of the object, and the speed of the object. The planner processor 220 is configured to determine a parameter regarding a driving route of the vehicle, a driving speed, or the like, for example, so as to avoid a collision between the vehicle 10 and the recognized object. The parameter determined by the planner processor 220 may be outputted to the vehicle controller 230.

The vehicle controller 230 is configured or programmed to control each part of the vehicle 10 on the basis of the parameter inputted from the planner processor 220. The vehicle controller 230 is configured to control, for example, a brake actuator of the vehicle 10, thereby performing an automatic brake control of the vehicle, or is configured to control a steering actuator of the vehicle, thereby performing an automatic steering control of the vehicle.

<Learning of Neural Network>

Figure 3:
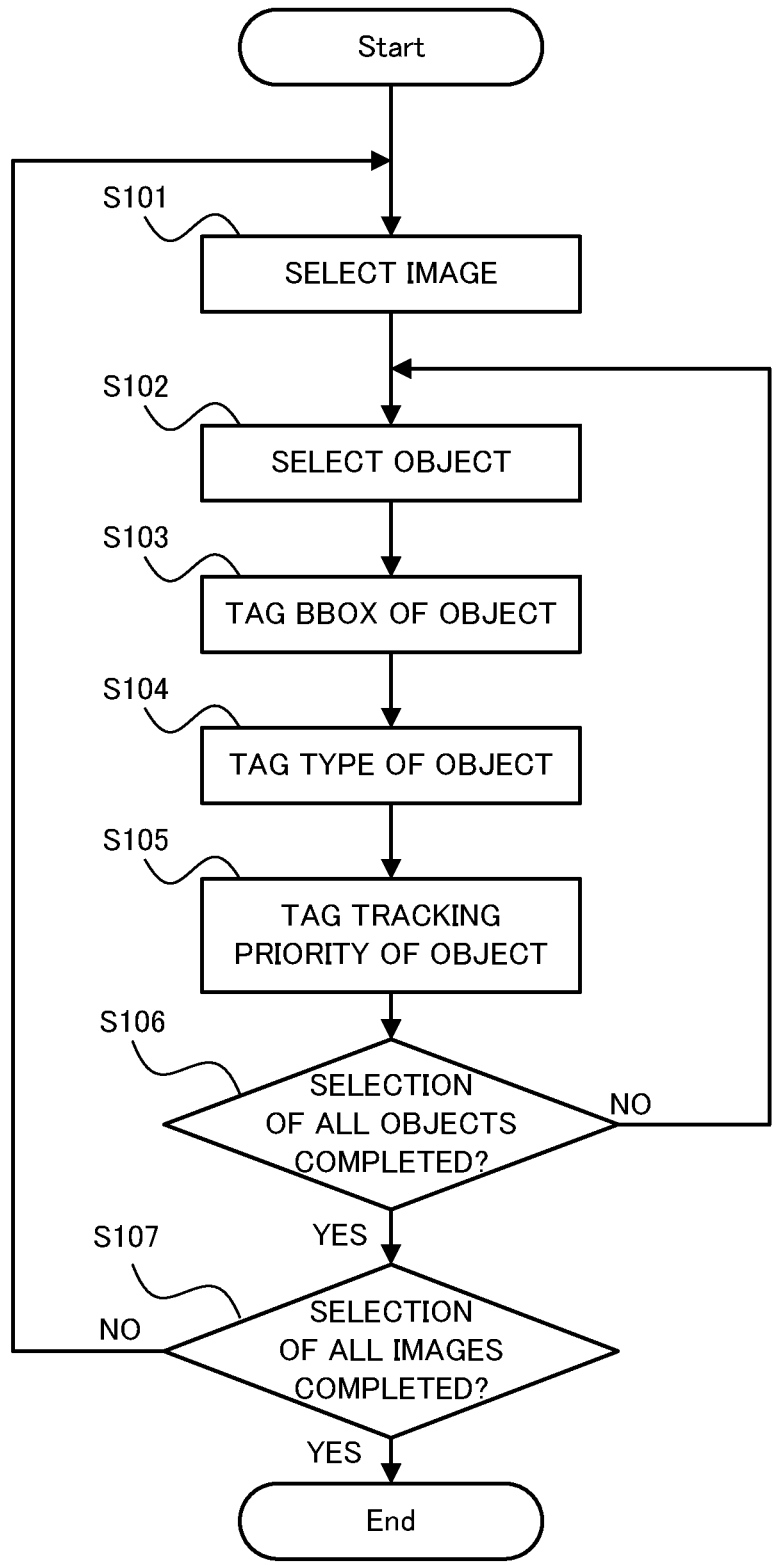
FIG. 3 is a flowchart illustrating a method of generating teacher data used for learning of the neural network according to the embodiment.

Next, a method of generating the teacher data used for the learning of the neural network 300 will be explained with reference to FIG. 3. FIG. 3 is a flowchart illustrating the method of generating the teacher data used for learning of the neural network according to the embodiment.

As illustrated in FIG. 3, when generating the teacher data, one image is selected from a plurality of image data, which are elements of the teacher data (step S101). The plurality of image data herein are the "second image data" in Supplementary Notes described later. The plurality of image data used to generate the teacher data are different from the time-series image data, such as the image data imaged by the camera 100. To put it differently, they are image data separately prepared to generate the teacher data.

Then, one object on which correct answer data is tagged is selected from a plurality of objects included in the selected image (step S102).

Then, a Bounding Box (BBOX), which is a rectangular area including the selected object, is tagged (step S103). In other words, correct answer data regarding the position of the object is tagged.

Then, the type of the selected object is tagged (step S104). In other words, correct answer data regarding the type of the object is tagged.

Then, the tracking priority of the selected object is tagged (step S105). In other words, correct answer data regarding the tracking priority of the object is tagged. As explained above, the correction answer data regarding the tracking priority may be tagged on the basis of the occlusion rate and the truncation rate of the object, and the degree of the influence on the driving of the vehicle, or the like. The tracking priority may be tagged by manual annotation by visual inspection of an operator, semi-automatic annotation, or full automatic annotation, or the like.

When the tagging of the position, the type, and the tracking priority of the object is completed, it is determined whether or not all the objects included in the selected image are selected, i.e., whether or not the tagging is performed on all the objects (step S106). If it is determined that all the objects are not selected (the step S106: NO), the step S102 is performed again. In other words, an object that is not selected out of the objects included in the image is selected as a target of the tagging, and a series of the steps is restarted. In this manner, the tagging of the correct answer data is repeated until it is completed for all the objects in the image. For the object that does not need to be tagged (e.g., the object that has a less meaning as the teacher data, etc.), the tagging may be omitted.

If it is determined that all the objects are selected (the step S106: YES), it is determined whether or not all the images are selected, i.e., whether or not the correct answer data is tagged on all the plurality of image data used to generate the teacher data (step S107). If it is determined that all the images are not selected (the step S107; NO), the step S101 is performed again. In other words, an image that is not selected out of the images used to generate the teacher data is selected as a target of the tagging, and a series of the steps is restarted. In this manner, the tagging of the correct answer data is repeated until it is completed for all the plurality of image data.

The generation of the teacher data described above is typically performed before the shipment of the apparatus, and the learning of the neural network 300 is also performed before the shipment of the apparatus.

The generation of the teacher data, however, may be performed by using a part of the image data imaged by the camera 100 after the shipment of the apparatus, or by using image data received from the exterior (e.g., another vehicle, etc.). In other words, online learning may be performed on the neural network 300.

<Object Recognition Operation>

Next, an object recognition operation using the neural network 300 that has learned, i.e., operations of the object recognizer 210, will be explained with reference to FIG. 4. FIG. 4 is a flowchart illustrating a flow of operations of the object recognizer according to the embodiment.

As illustrated in FIG. 4, in the object recognition operation, the first recognizer 211 firstly calculates the position, the type, and the tracking priority of the object by using the neural network 300 (step S201). The calculated position, type, and tracking priority of the object are outputted to the second recognizer 212. In the embodiment, as the position of the object, pixel coordinates indicating the position of the Bounding Box (BBOX) of the object are calculated.

The second recognizer 212 then generates a list A of objects on which the tracking process is to be performed, on the basis of the tracking priority (step S202). The objects included in the list A (in other words, the objects on which the tracking process is to be performed) may be determined depending on whether or not the tracking priority satisfies a predetermined condition. For example, out of objects included an image, an object with a tracking priority that is greater than a predetermined threshold value B may be added to the list A.

Then, from the objects included in the list A, objects are selected one by one in descending order by a pixel size (step S203). Then, a tracking state updating process, i.e., the tracking process, is performed on the selected objects (step S204). Specifically, for example, a Kanade-Lucas-Tomasi (KLT) algorithm may be used to perform a time-series tracking process on a characteristic point within the BBOX of the target object calculated in the step S201. In another embodiment, another tracking method, such as an object tracking process by a Mean-shift method, may be also used.

It is then determined whether or not all the objects included in the list A are selected (step S205). In other words, it is determined whether or not the tracking process is performed on all the objects included in the list A. If all the objects included in the list A are not selected (the step S205: NO), it is determined whether or not the number of the selected objects is greater than or equal to a threshold value N1 (step S206). The threshold value N1 may be set to be an upper limit value of the number of objects on which the tracking process is performed, and may be set in advance, for example, in accordance with an arithmetic processing capability of the ECU 200 or the like.

If the number of the selected objects is not greater than or equal to the threshold value N1 (the step S206: NO), the step S203 is performed again. In other words, an object with the largest pixel size is selected as a target of the tracking process from the objects that are not selected yet, and a series of steps is repeated.

On the other hand, if all the objects included in the list A are selected (the step S205: YES), or if the number of the selected objects is greater than or equal to the threshold value N1 (the step S206: YES), the type, the position, and the speed of the tracking target object are outputted on the basis of a result of the tracking process (step S207). In other words, the result of the tracking process is added to a processing result of the first recognizer 211, thereby to output information about the object. On the other hand, for a tracking non-target object (i.e., an object that is not included in the list A, or an object that is not selected as the tracking target from the objects included in the list A), the type and the position of the object are outputted on the basis of the processing result of the first recognizer 211 (step S208).

If there is room in the arithmetic or computational load even though the tracking process is performed on all the objects included in the list A, for example, if the number of the objects on which the tracking process is performed does not satisfy the threshold value N1 or in similar cases, the tracking process may be performed even on the object that is not included in the list A. In this case, for a new list C, which is obtained by selection using a condition that is milder than the condition for the tracking priority for being included in the list A (i.e., the predetermined threshold value B), the same steps as the steps S203 to S206 may be performed until the total number of the objects on which the tracking process is performed reaches an appropriate value (e.g., the threshold value N1).

<Technical Effect>

Next, an explanation will be given to a technical effect obtained by the operations of the object recognizer 210 (i.e., the object recognition apparatus) according to the embodiment.

As explained with reference to FIG. 1 to FIG. 4, according to the object recognizer 210 in the embodiment, whether or not to perform the tracking process is determined on the basis of the tracking priority. Specifically, the tracking process may be performed only on an object with a high tracking priority, and the tracking process may not be performed on an object with a low tracking priority. It is thus possible to suppress the arithmetic load of the apparatus, in comparison with when the tracking process is performed on all the objects.

The tracking priority of the object is hardly accurately calculated, for example, in a rule-based process. In the embodiment, however, the neural network 300 that has learned is used, as described above, by which the tracking priority can be accurately calculated. Moreover, the neural network 300 performs the learning by using non-time-series images. It is thus possible to realize efficient learning, for example, in comparison with when the time-series image data is used to learn.

<Supplementary Notes>

Various aspects of embodiments of the present disclosure derived from the embodiment explained above will be explained hereinafter.

(Supplementary Note 1)

An object recognition apparatus described in Supplementary Note 1 is an object recognition apparatus configured to recognize a first object included in first image data on the basis of the first image data inputted in a time-series manner, the object recognition apparatus provided with: a first output device configured to output a provisional position of the first object and a tracking priority, which indicates a degree to which a time-series tracking process is to be performed, by using a neural network that receives an entry of the first image data; and a second output device configured to receive entries of the first image data, the provisional position and the tracking priority, and configured (i) to perform the time-series tracking process and output a position and a speed, for the first object in which the tracking priority satisfies a predetermined condition, and (ii) to output a position without performing the time-series tracking process, for the first object in which the tracking priority does not satisfy the predetermined condition, wherein the neural network is a learned neural network that has learned by using teacher data, wherein the teacher data includes second image data, which is different from the first image data, and correct answer data of the tracking priority and a position of a second object included in the second image data.

According to the object recognition apparatus described in Supplementary Note 1, whether or not to perform the tracking process is determined on the basis of the tracking priority, and an unnecessary tracking process is thus prevented. It is therefore possible to recognize the position and the speed of the object while suppressing the arithmetic load.

Moreover, the neural network used to obtain the tracking priority has learned by using the teacher data, wherein the teacher data includes second image data, which is different from the first image data inputted in the time-series manner, and correct answer data of the tracking priority and the position of the second object included in the second image data. This allows the teacher data whose generation cost is relatively small, to obtain the tracking priority with high accuracy.

(Supplementary Note 2)

In an object recognition apparatus described in Supplementary Note 2, the correct answer data of the tracking priority of the second object is determined on the basis of a rate of the second object that is hidden by overlapping with another object located on a near side closer than the second object.

According to the object recognition apparatus described in Supplementary Note 2, the correct answer data of the tracking priority is determined on the basis of the rate of the recognition target object that is hidden or blocked by another object, i.e., the so-called occlusion rate. An object with a relatively high occlusion rate may be determined to have a low priority to be recognized by performing the tracking process thereon, because another object is highly likely located on the near side of the object with the high occlusion rate. On the other hand, an object with a relatively low occlusion rate may be determined to have a high priority to be recognized by performing the tracking process thereon, because another object is less likely located on the near side of the object with the low occlusion rate; namely, because the object with the low occlusion rate is highly likely located on the nearest side. It is thus possible to perform the learning of the neural network, more appropriately, by determining the correct answer data of the tracking priority on the basis of the occlusion rate of the second object.

(Supplementary Note 3)

In an object recognition apparatus described in Supplementary Note 3, the correct answer data of the tracking priority of the second object is determined on the basis of a rate of the second object that is hidden by protruding from a frame of the second image data.

According to the object recognition apparatus described in Supplementary Note 3, the correct answer data of the tracking priority is determined on the basis of the rate of the object that is a recognition target protrudes from an imaging range, i.e., the so-called truncation rate. An object with a relatively high truncation rate may be determined to have a low priority to be recognized by performing the tracking process thereon, because the object is located so as to be significantly out of an imaging range of the second image data. On the other hand, an object with a relatively low truncation rate may be determined to have a high priority to be recognized by performing the tracking process thereon, because the object is located such that a large part of the object is in the imaging range of the second image data, i.e., because the object is located in a position near the front of the imaging range. It is thus possible to perform the learning of the neural network, more appropriately, by determining the correct answer data of the tracking priority on the basis of the truncation rate of the second object.

(Supplementary Note 4)

In an object recognition apparatus described in Supplementary Note 4, the correct answer data of the tracking priority of the second object is determined on the basis of a degree of an influence of the second object on driving of a vehicle on which said object recognition apparatus is mounted.

An object with a high degree of the influence on the driving of a host vehicle, such as, for example, another vehicle that drives on the same lane as that of a vehicle on which the object recognition apparatus is mounted, or a person who possibly runs out into a road, should be recognized with relatively high accuracy so as to avoid a risk of a collision. It is thus possible to perform the learning of the neural network, more appropriately, by determining the correct answer data of the tracking priority on the basis of the degree of the influence of the second object on the driving of the vehicle.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. An object recognition apparatus configured to recognize a first object included in first image data on the basis of the first image data inputted in a time-series manner, said object recognition apparatus comprising:
   a first output device configured to output a provisional position of the first object and a tracking priority, which indicates a degree to which a time-series tracking process is to be performed, by using a neural network that receives an entry of the first image data; and
   a second output device configured to receive entries of the first image data, the provisional position and the tracking priority, and configured (i) to perform the time-series tracking process and output a position and a speed, for the first object in which the tracking priority satisfies a predetermined condition, and (ii) to output a position without performing the time-series tracking process, for the first object in which the tracking priority does not satisfy the predetermined condition, wherein
   the neural network is a learned neural network that has learned by using teacher data, wherein the teacher data includes second image data, which is different from the first image data, and correct answer data of the tracking priority and a position of a second object included in the second image data, the correct answer data of the tracking priority of the second object being determined on the basis of a rate of the second object that is hidden by overlapping with another object located on a near side closer than the second object.

2. The object recognition apparatus according to claim 1, wherein the correct answer data of the tracking priority of the second object is determined on the basis of a degree of an influence of the second object on driving of a vehicle on which said object recognition apparatus is mounted.

3. An object recognition apparatus configured to recognize a first object included in first image data on the basis of the first image data inputted in a time-series manner, said object recognition apparatus comprising:
   a first output device configured to output a provisional position of the first object and a tracking priority, which indicates a degree to which a time-series tracking process is to be performed, by using a neural network that receives an entry of the first image data: and
   a second output device configured to receive entries of the first image data, the provisional position and the tracking priority, and configured (i) to perform the time-series tracking process and output a position and a speed, for the first object in which the tracking priority satisfies a predetermined condition, and (ii) to output a position without performing the time-series tracking process, for the first object in which the tracking priority does not satisfy the predetermined condition, wherein
   the neural network is a learned neural network that has learned by using teacher data, wherein the teacher data includes second image data, which is different from the first image data, and correct answer data of the tracking priority and a position of a second object included in the second image data, the correct answer data of the tracking priority of the second object being determined on the basis of a rate of the second object that is hidden by protruding from a frame of the second image data.

4. The object recognition apparatus according to claim 3, wherein the correct answer data of the tracking priority of the second object is determined on the basis of a degree of an influence of the second object on driving of a vehicle on which said object recognition apparatus is mounted.

* * * * *